(12) United States Patent
Barrus et al.

(10) Patent No.: US 7,676,748 B1
(45) Date of Patent: Mar. 9, 2010

(54) SYSTEM GRAPHICS FOR SECURITY SHIELD

(75) Inventors: Frank E. Barrus, New Ipswich, NH (US); Lawrence R. Rau, Dublin, NH (US); Craig F. Newell, Lowell, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 940 days.

(21) Appl. No.: 10/287,857

(22) Filed: Nov. 4, 2002

(51) Int. Cl.
*G06F 3/00* (2006.01)

(52) U.S. Cl. .............. 715/741; 715/750; 715/867; 715/961

(58) Field of Classification Search ........... 715/741, 715/867, 961; 340/825; 713/320–324, 164–168, 713/182–183, 186; 726/1–36
See application file for complete search history.

(56) References Cited

U.S. PATENT DOCUMENTS

| | | | | |
|---|---|---|---|---|
| 4,959,860 A | * | 9/1990 | Watters et al. | 726/19 |
| 5,173,940 A | * | 12/1992 | Lantz et al. | 726/19 |
| 5,581,700 A | * | 12/1996 | Witte | 726/19 |
| 5,963,142 A | * | 10/1999 | Zinsky et al. | 340/5.74 |
| 6,072,489 A | * | 6/2000 | Gough et al. | 715/803 |
| 6,957,398 B1 | * | 10/2005 | Nayeri | 715/867 |
| 2002/0016918 A1 | * | 2/2002 | Tucker et al. | 713/190 |
| 2002/0083337 A1 | * | 6/2002 | Welcher et al. | 713/201 |
| 2002/0196274 A1 | * | 12/2002 | Comfort et al. | 345/741 |
| 2003/0063120 A1 | * | 4/2003 | Wong et al. | 345/746 |
| 2003/0074590 A1 | * | 4/2003 | Fogle et al. | 713/320 |
| 2003/0107600 A1 | * | 6/2003 | Kwong et al. | 345/764 |
| 2004/0113940 A1 | * | 6/2004 | Brockway et al. | 345/741 |
| 2005/0138373 A1 | * | 6/2005 | Clark et al. | 713/166 |

OTHER PUBLICATIONS

Crawford, Sharon. Windows 2000 Pro: The Missing Manual. O'Reilly. Nov. 2000. Chapters 2.1., 8.17. & 10.2.*
Microsoft Windows 2000 Professional. Figures 1 & 2.*
Crawford, Sharon. Windows 2000 Pro: The Missing Manual. O'Reilly. Nov. 2000. Chapters 2.2 & 8.6.*

* cited by examiner

*Primary Examiner*—Ryan F Pitaro
(74) *Attorney, Agent, or Firm*—Osha • Liang LLP

(57) ABSTRACT

A method for providing a secure lockout from executing application programs is provided. An opaque graphical component obscures graphical components for all executing software (applications) programs on a display apparatus and prevents events from reaching the executing application programs.

13 Claims, 4 Drawing Sheets

SYSTEM GRAPHICS FOR SECURITY SHIELD

BACKGROUND OF THE INVENTION

In handheld devices, mobile devices, and information appliances, memory and CPU power are limited. In such environments, there are limited system resources for providing objects for both the run-time system (applications) and the operating system. One solution is to design a run-time system specification (i.e. written in a programming language) specifically in concert with the operating system which enables objects to be shared between the operating system and the run-time system. This approach reduces the clear distinction between operating system resources and the run-time system resources. This approach also requires applications to be written in the certain programming language to run with the operating system.

Further, there is a need for security to prevent unauthorized access to the device.

SUMMARY OF THE INVENTION

The present invention provides security through a graphical subsystem. The graphical subsystem prevents events from reaching applications in a computer system. To accomplish this, a security graphical component is included in a graphics component hierarchy. The security graphical component is at a higher level in the graphics component hierarchy than an application graphical component. Upon detecting a lockout event, access to the computer system is prevented by the invention displaying an opaque security shield defined by the security component on a display interface. The security shield obscures the application graphical component on the display interface and prevents all events from being forwarded to an application program corresponding to the application graphical component.

The lockout event may be the lack of detection of any event for a predetermined time or the detection of power up of the computer system. The display of the opaque security shield may be terminated upon detecting the successful login of an authorized user.

The application program may be an object orientated application such as a JAVA application.

A login graphical component may be included in the graphics component hierarchy. The login graphical component is accessible only from the security graphical component and is displayed on top of the security graphical component.

A keypad graphical component may be included in the graphics component hierarchy. The keypad graphical component is accessible only from the security graphical component and displayed on top of the security graphical component.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
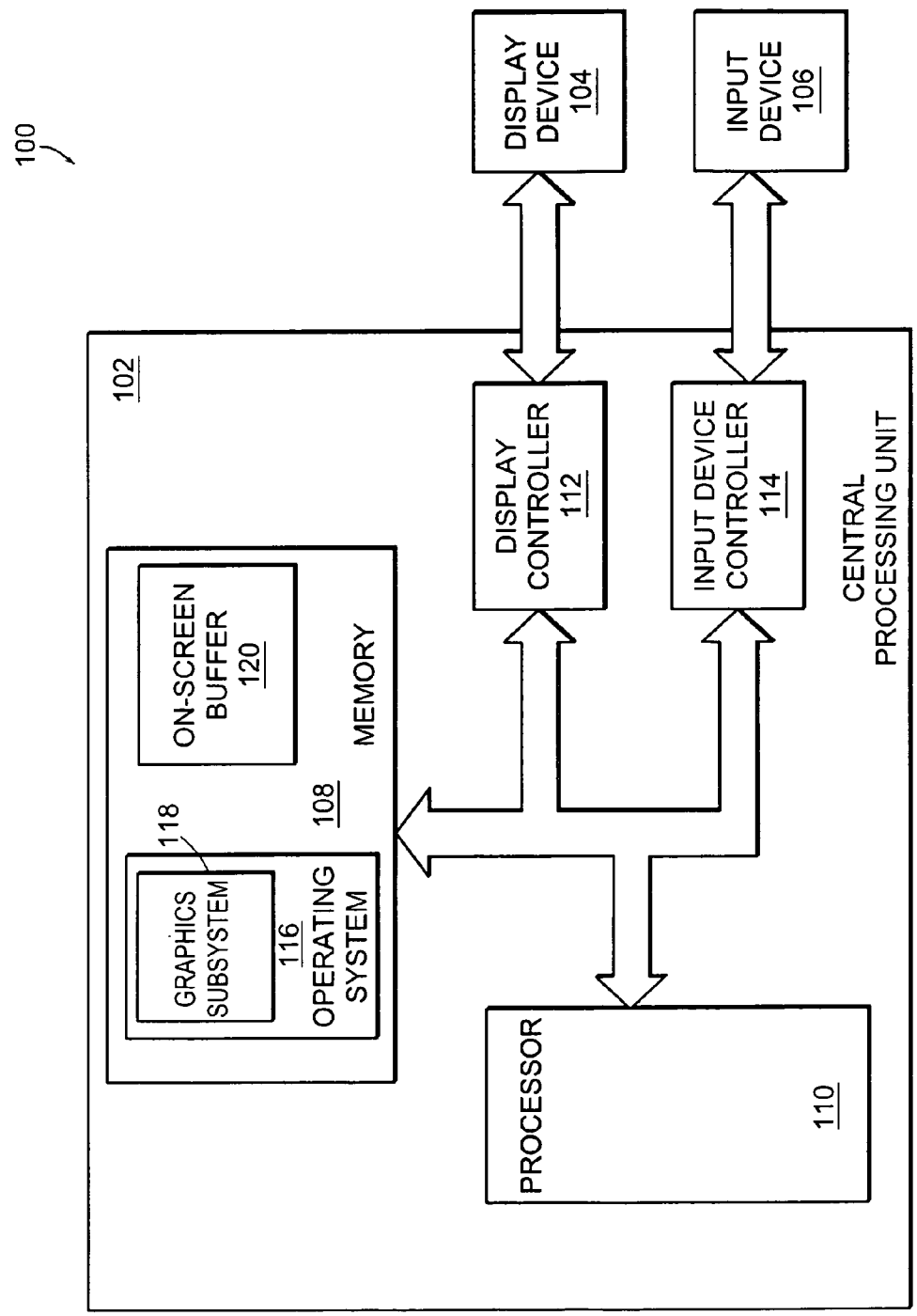
FIG. 1 is a block diagram of a computer system including an on-screen buffer memory managed by a graphics subsystem in the operating system.

FIG. 1 is a block diagram of a computer system 100 including an on-screen buffer 120 managed by a graphics subsystem 118 in the operating system 116. The computer system 100 includes a central processing unit 102 coupled to a display device 104 and an input device 106. The display device 104 includes a screen for displaying a two-dimensional array of pixels representing the contents of the on-screen buffer 120. The screen can be a flat panel screen, a Cathode Ray Tube (CRT), a Liquid Crystal Display (LCD) or any other type of screen typically used by a display device.

The operating system 116 is stored in a memory 108 in the computer system 100. The graphical subsystem 118 in the operating system 116 manages updates to the on-screen buffer 120. In the embodiment shown, a portion of the memory 108 is reserved for the on-screen buffer 120. However, in alternate embodiments, the on-screen buffer 120 can be a separate memory.

A processor 110 is coupled to the memory 108, a display controller 112 and an input device controller 114. The display controller 112 coupled to the display device 104 reads the on-screen buffer 120 and transmits the data for display on the display device 104. The processor 110 is coupled to the input device controller 114 for processing key codes received from an input device 106 coupled to the input device controller 114. The input device 106 can be a keyboard, keypad, mouse or any other type of input device typically used in a computer system.

In one embodiment, the processor 110 is an INTEL® StrongARM Reduced Instruction Set Computer (RISC) processor which includes a data cache and an instruction cache. The instruction cache and data cache increases the performance of the computer system 100 by reducing the number of accesses to the memory 108.

Figure 2:
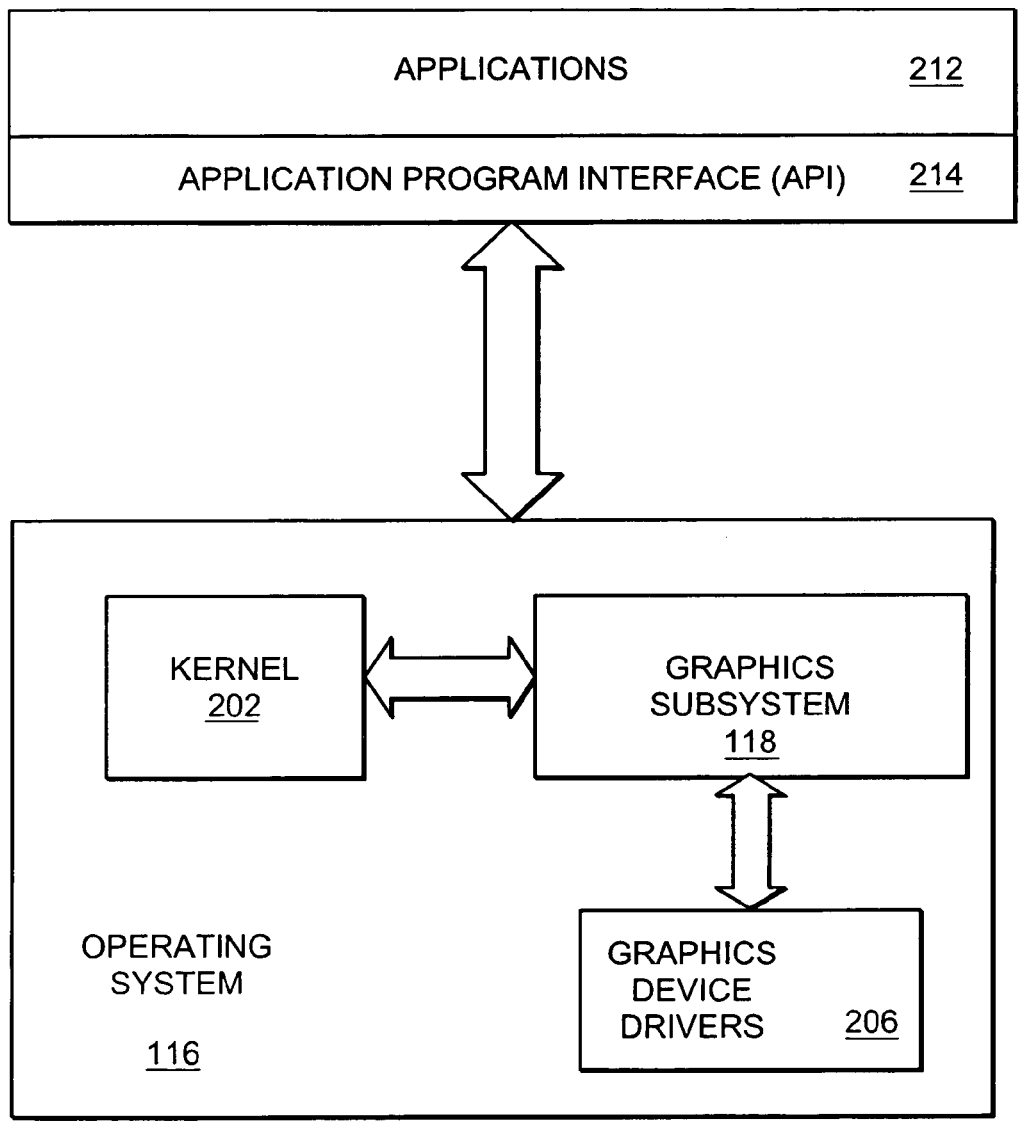
FIG. 2 is a block diagram illustrating elements in the operating system shown in FIG. 1.

FIG. 2 is a block diagram of the operating system 116 including the graphics subsystem 118 shown in FIG. 1. The operating system 116 also includes a kernel 202 and graphics device drivers 206. An application 212 calls the operating system 116 through an Applications Program Interface (API) 214. The application program can be an object-oriented application, for example, a JAVA application.

The type of display device 104 coupled to the computer system 100 is hidden from applications 212 by the operating system 116. The graphics subsystem 118 includes functions which are common to all display devices 104. Each graphics device driver 206 includes functions to support a particular type of display device 104.

The graphics subsystem 118 includes functions for managing the on-screen buffer 120 in memory 108. The on-screen buffer 120 corresponds to the two dimensional co-ordinate system of the screen on the display device 104 and is continuously read by the display controller 112 to refresh the screen. All updates to the data displayed on the screen are performed directly in the on-screen buffer 120 while the on-screen buffer 120 continues to be read to refresh the screen.

The graphics subsystem 118 in the operating system 116 manages what is stored in the on-screen buffer 120. Typically, each executing application having a graphical user interface defines an application graphical component in the graphical subsystem. All application graphical components are contained within a "root"container. A container is a screen area that has been declared by the operating system to be its own entity and that can contain other components. A container is a component that can have children which are components contained within it and are visually represented on top of the parent container.

The graphics subsystem 118 receives notification of events from external devices. For example, an event can be a key code received from a keyboard, a keypad or a touch screen. Upon receiving notification of an event, the graphics subsystem 118 notifies all components that have registered to receive notification of the event. For example, an application graphical component for a word processing application can register to receive notification of events from input devices such as, a keyboard or mouse. However, events are only forwarded to application graphical components corresponding to visible regions on the screen.

An operating system constantly monitors events such as mouse clicks and key strokes in visible components on the screen. The operating system reports the events to applications having a graphical user interface. In object orientated languages such as JAVA, event listeners are registered to event sources, for example, buttons in the application graphical component. The operating system reports an event to the respective application graphical component, for example, to the application corresponding to the component in which the mouse click was detected.

A fully opaque component rendered on top of another component obscures the underlying component. Typically, all application graphics components are based off a root container. The application graphical components are displayed on top of the root container on the screen. All events, for which a particular application graphical component has registered, are passed to the respective applications while any of the screen area corresponding to the component is visible on the screen.

Figure 3:
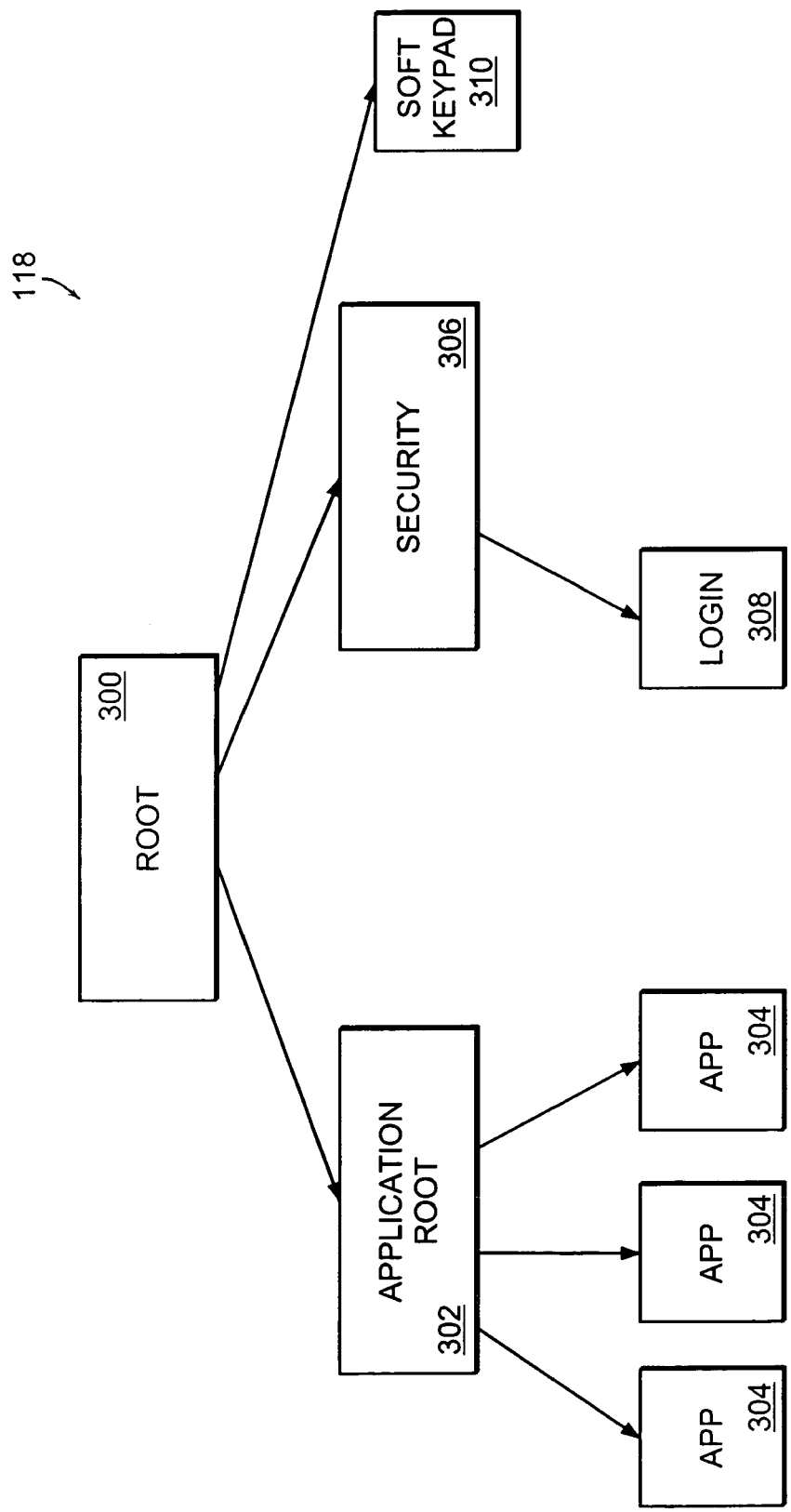
FIG. 3 illustrates a graphics component hierarchy of the graphics subsystem which provides security according to the principles of the present invention.

FIG. 3 illustrates a graphics component hierarchy of the graphics subsystem 118 which provides security according to the principles of the present invention. There is a "root" container 300 from which all other components are descendants. An "application root" 302 is a child of the root container 300. All application graphical components 304 are children of the application root 302 and are thus confined to one area of the graphics component hierarchy. A security graphical component 306 is a direct child of the hierarchy root 300, such that when the screen area corresponding to the security graphical component 306 is placed on top of the application root screen area, the application graphical components 304 are covered on the screen. Thus, the security graphical component 306 effectively provides a security shield.

Events are passed through to graphical components based on visibility. Thus, while the application graphical components 304 are covered, and thus not visible, no events get through to the application graphics components while the security shield is displayed on the screen. The guarantee is accomplished by putting the security shield 306 (security graphical component) in a different portion of the component hierarchy that the standard applications do not have access to.

A soft keyboard can be provided for passing events to the security graphical component 306 by adding a soft keyboard component 310 that has the root container 300 as its immediate parent. The soft keyboard component 310 is displayed on top of the security shield on the screen and is accessible only from the security graphical component 306.

Restating the foregoing, the security graphical component 306 is on a higher level than the application root component 302. Thus, the security graphical component 306 is guaranteed to be displayed on the screen of the display interface on top of all of the standard application graphical components 304.

Figure 4:
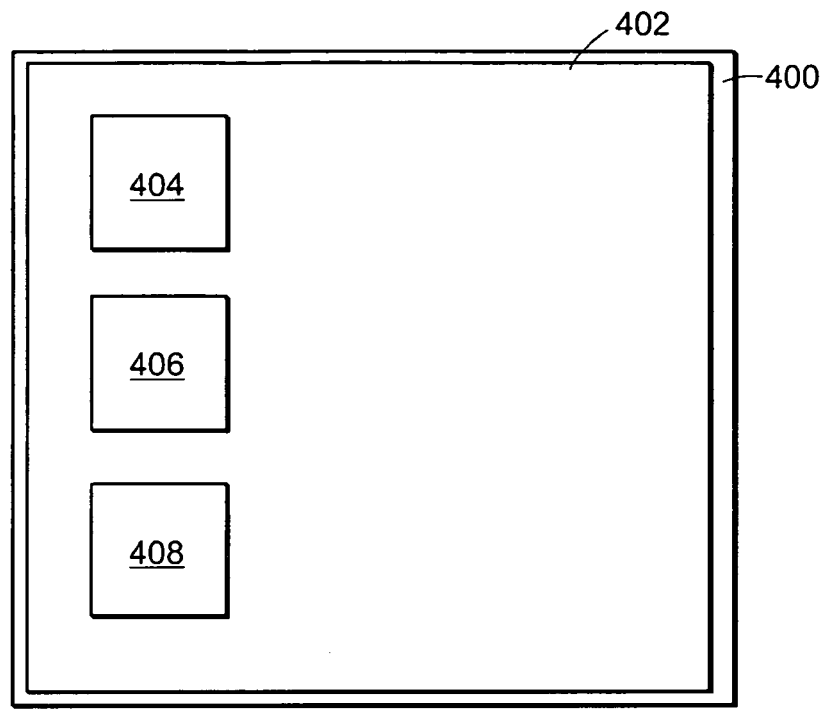
FIG. 4 illustrates a plurality of application graphical components displayed on a screen, each of which can receive notification of events for which the component has registered.

FIG. 4 illustrates a plurality of application graphical components 404, 406, 408 displayed on a screen of a display device 104 (FIG. 1), each of which can receive notification of events for which the respective application graphical component has registered. Following the graphics components hierarchy shown in FIG. 3, the visible portion of the "root" container 300 is displayed in region 400. The visible portion of the applications root component 302 is displayed in region 402. The application graphical components 404, 406, 408 are displayed on top of region 402 corresponding to the application's root component 302.

Figure 5:
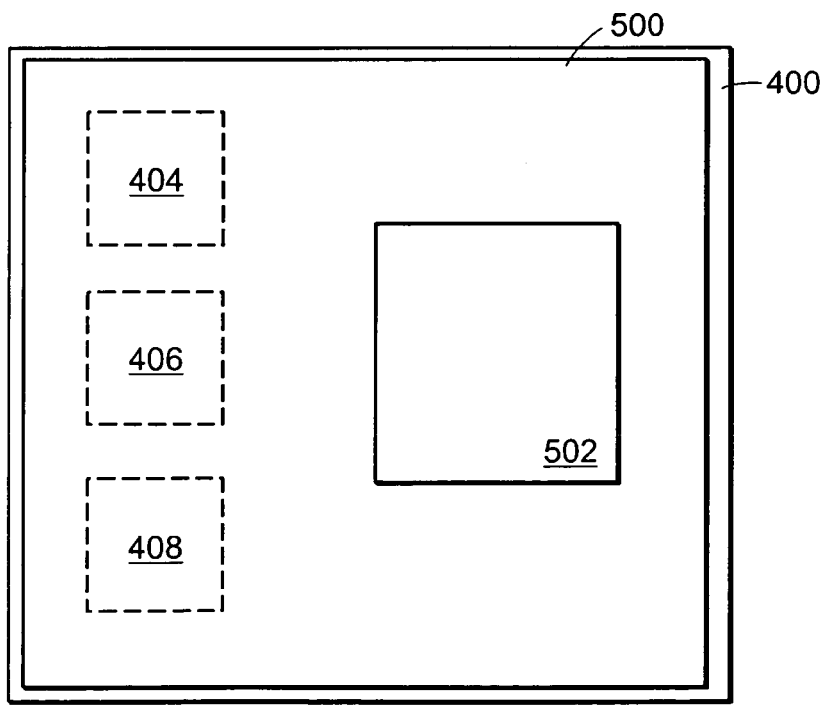
FIG. 5 illustrates a security graphical component displayed on the screen of FIG. 4 in a display device after a lockout event has been detected according to the principles of the present invention.

FIG. 5 illustrates an opaque security shield defined by the security graphical component 306 displayed on the screen of the display device 104 after a lockout event has been detected according to the principles of the present invention. The lockout event can be the lack of detection of any event for a predetermined time, for example, if no key codes have been detected over a predefined period of time, the user of the computer system may no longer be using the computer system. Another lockout event can be the detection of system power up.

Upon detecting a lockout event, an opaque security shield 500 defined by the security graphical component 306 appears on top of the root container region 400 displayed on the screen of the display device 104. The displayed opaque security shield 500 overlays the display regions of all of the application graphical components 404, 406, 408 (shown in dashed lines). The opaque security shield 500 obscures all of the underlying application graphical components 404, 406 408 rendering them not visible (not viewable). The opaque security shield 500 can receive notification of events because it is visible.

The opaque security shield 500 effectively prevents any of the standard graphics corresponding to application graphical components from being visible, by covering the application graphical components' display regions. It also prevents any events from passing through to the underlying application graphical components by making them not visible (unable to be viewed).

The display of the opaque security shield 500 may be terminated upon detection of the successful login of an authorized user. For example, an application graphical component 308 (FIG. 3) which is a direct child of the security graphical component 306 as described in conjunction with the component hierarchy shown in FIG. 3 provides a login window 502 which is displayed on top of the opaque security shield 500. Upon detecting a successful login by an authorized user, the security graphical component 306 terminates, resulting in termination of the display of the opaque security shield 500 on the display device 104. In a preferred embodiment, the application graphical component 308 corresponds to an object oriented application (e.g. a JAVA application). Further, the login by the user is accomplished through a soft keypad component 310 which renders a keypad display on top of the security shield 500 in the display device 104 during the login process.

It will be apparent to those of ordinary skill in the art, that methods involved in the present invention may be embodied in a computer program product that includes a computer usable medium. For example, such a computer usable medium can consist of a read only memory device, such as a hard drive or a computer diskette, having computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for disabling access to executing application programs, the method comprising:
    displaying a visible portion of a root container of a graphics component hierarchy;
    displaying a visible portion of an application root component on top of the visible portion of the root container, wherein the application root component is a direct child of the root container;
    displaying a first application graphical component corresponding to a first executing application program on top of the visible portion of the application root component, wherein the first application graphical component is a child of the first application root component, and wherein the first application graphical component receives events only when the first application graphical component is visible;
    displaying a second application graphical component corresponding to a second executing application program on top of the visible portion of the application root component, wherein the second application graphical component is a child of the second application root component and wherein the second application graphical component receives events only when the second application graphical component is visible; and
    displaying, when a lockout event is detected, an opaque security shield on top of the visible portion of the root container such that the first application graphical component and the second application graphical component are rendered invisible, wherein the opaque security shield is defined by a security graphical component, and wherein the security graphical component is a direct child of the root container,
    wherein the first executing application is distinct from the second executing application.

2. The method of claim 1, further comprising:
    registering the first application graphical component to receive an event; and
    detecting the event after the displaying of the opaque security shield, wherein the event is not sent to the first application graphical component.

3. The method of claim 1, further comprising:
    displaying a login graphical component on top of the opaque security shield, wherein the login graphical component is a child of the security graphical component.

4. The method of claim 3, wherein the display of the opaque security shield is terminated upon detecting successful login of an authorized user.

5. The method of claim 1, further comprising:
    displaying a keyboard graphical component on top of the opaque security shield, wherein the keyboard graphical component is a direct child of the root container.

6. The method of claim 1, wherein the lockout event is one selected from a group consisting of: a lack of detection of any event for a predetermined time and detection of system power up.

7. A system for disabling access to executing application programs, the system comprising:
    a display;
    a first application program;
    a second application program;
    a graphics subsystem comprising a graphics component hierarchy, wherein the graphics component hierarchy comprises:
        a root container corresponding to a root container region of the display,
        an application root component corresponding to an application root region of the display, wherein the application root component is a direct child of the root container, and wherein the application root region is configured to display on top of the root container region,
        a first application graphical component corresponding to the first application program, wherein the first application graphical component is a child of the application root component, and wherein the first application graphical component is configured to display on top of the application root region,
        a second application graphical component corresponding to the second application program, wherein the second application graphical component is a child of the application root component, and wherein the second application graphical component is configured to display on top of the application root region, and
        a security graphical component, wherein the security graphical component is a direct child of the root container and wherein the security graphical component is configured to display on top of the root container region,
    wherein the graphics subsystem is configured to notify the first application graphical component and the second application graphical component of an event only if the first application graphical component and the second application graphical component are visible on the display when the graphics subsystem receives the event,
    wherein when a lockout event is received by the graphics subsystem while the first application program and the second application program are executing, an opaque security shield defined by the security graphical component is displayed on top of the root container region such that the first application graphical component and the second application graphical component are not visible on the display, and
    wherein the first application program is distinct from the second application program.

8. The system of claim 7, wherein the lockout event is one selected from a group consisting of: a lack of detection of any event for a predetermined time and detection of system power up.

9. The system of claim 7, wherein the graphics component hierarchy further comprises a login graphical component, wherein the login graphical component is a child of the security graphical component and wherein the login graphical component is configured to display on top of the opaque security shield.

10. The system of claim 9, wherein the display of the opaque security shield is terminated upon detecting successful login of an authorized user.

11. The system of claim 7, wherein the graphics component hierarchy further comprises a keyboard graphical component, wherein the keyboard graphical component is a direct child of the root container, and wherein the keyboard graphical component is configured to display on top of the opaque security shield.

12. A computer readable medium comprising computer program code stored therein for disabling access to executing application programs, the computer program code comprising instructions to:
  display a visible portion of a root container of a graphics component hierarchy;
  display a visible portion of an application root component on top of the visible portion of the root container, wherein the application root component is a direct child of the root container;
  display a first application graphical component corresponding to a first executing application program on top of the visible portion of the application root component, wherein the first application graphical component is a child of the first application root component, and wherein the first application graphical component receives events only when the first application graphical component is visible;
  display a second application graphical component corresponding to a second executing application program on top of the visible portion of the application root component, wherein the second application graphical component is a child of the second application root component and wherein the second application graphical component receives events only when the second application graphical component is visible; and
  display, when a lockout event is detected, an opaque security shield on top of the visible portion of the root container such that the first application graphical component and the second application graphical component are rendered invisible, wherein the opaque security shield is defined by a security graphical component, and wherein the security graphical component is a direct child of the root container,
  wherein the first executing application is distinct from the second executing application.

13. The computer readable medium of claim 12, wherein the computer program code further comprises instructions to:
  register the first application graphical component to receive an event; and
  detect the event after the displaying of the opaque security shield, wherein the event is not sent to the first application graphical component.

* * * * *